United States Patent [19]

Trumbull

[11] Patent Number: 4,645,318

[45] Date of Patent: Feb. 24, 1987

[54] APPARATUS FOR PROJECTING A LARGELY 360° MOTION PICTURE IMAGE

[75] Inventor: Douglas Trumbull, Santa Monica, Calif.

[73] Assignee: Showscan Film Corporation, Marina Del Rey, Calif.

[21] Appl. No.: 762,199

[22] Filed: Aug. 2, 1985

Related U.S. Application Data

[63] Continuation-in-part of Ser. No. 659,266, Oct. 9, 1984, Pat. No. 4,560,260, which is a continuation of Ser. No. 412,040, Aug. 26, 1982, Pat. No. 4,477,160, which is a continuation-in-part of Ser. No. 885,901, Mar. 13, 1979, abandoned, which is a continuation-in-part of Ser. No. 713,658, Aug. 12, 1976, abandoned, which is a continuation-in-part of Ser. No. 626,965, Oct. 29, 1975, abandoned.

[51] Int. Cl.$^4$ ............................................. G03B 37/00
[52] U.S. Cl. ...................................... 352/69; 352/198; 352/180; 352/109; 352/143; 352/146
[58] Field of Search ................. 352/69, 200, 198, 202, 352/180, 146, 143, 109

[56] References Cited

U.S. PATENT DOCUMENTS

| | | | |
|---|---|---|---|
| 2,392,440 | 1/1946 | Waller et al. | 352/69 |
| 2,429,364 | 10/1947 | Miller | 352/146 |
| 2,556,769 | 6/1951 | Miller | 352/143 |
| 2,966,096 | 12/1960 | D'Incerti et al. | 352/69 |
| 3,191,182 | 6/1965 | Caldwell et al. | 352/69 |
| 3,193,840 | 7/1965 | Mercer | 352/146 |
| 3,318,184 | 5/1967 | Jackson | 352/202 |
| 3,720,460 | 3/1973 | Wilkinson | 352/198 |
| 3,753,612 | 8/1973 | Okey et al. | 352/109 |
| 3,788,736 | 1/1974 | Oulevay et al. | 352/180 |
| 4,123,152 | 10/1978 | Farnum | 352/69 |

Primary Examiner—Monroe H. Hayes
Attorney, Agent, or Firm—Freilich, Hornbaker, Rosen & Fernandez

[57] ABSTRACT

An apparatus is described for projecting a motion picture image on a screen that extends 360° around the viewers, by moving a film past a slit through which light shines, forming an image of the slit on the screen, and rapidly revolving the slit image around the screen. The film moves rapidly enough to permit the projected slit image to rotate around the screen at a rate of at least about 50 rotations per second. The film, which moves continuously, can be free of sprocket holes and can be driven by a capstan drive, and the film can have a thickness less than half the thickness of present film stock so that a roll of film of moderate diameter can last several minutes.

4 Claims, 10 Drawing Figures

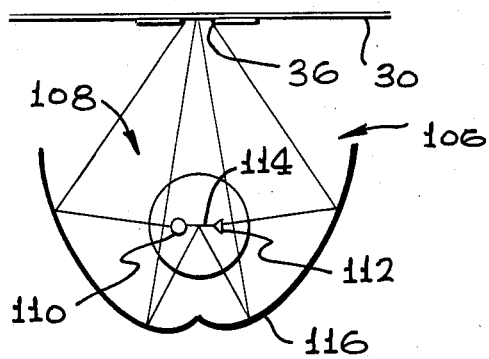
FIG. 5
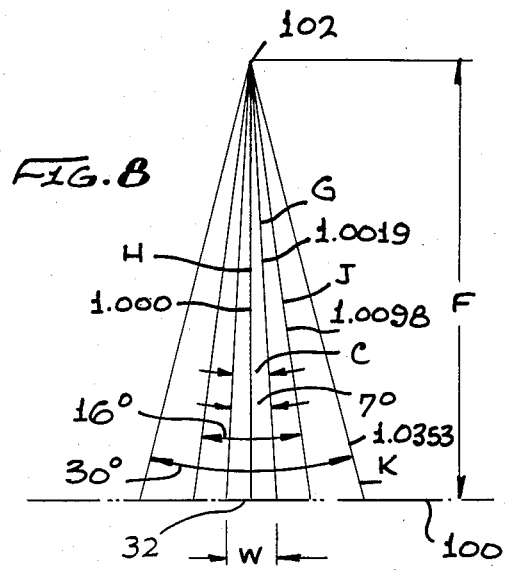
FIG. 6
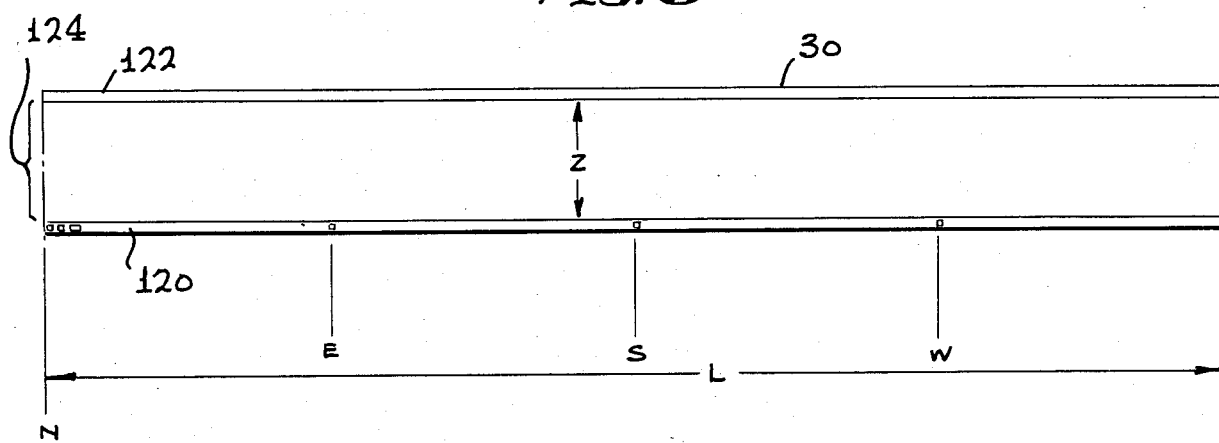
FIG. 7
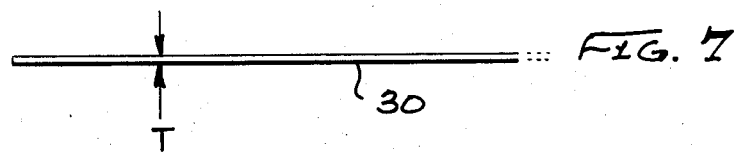
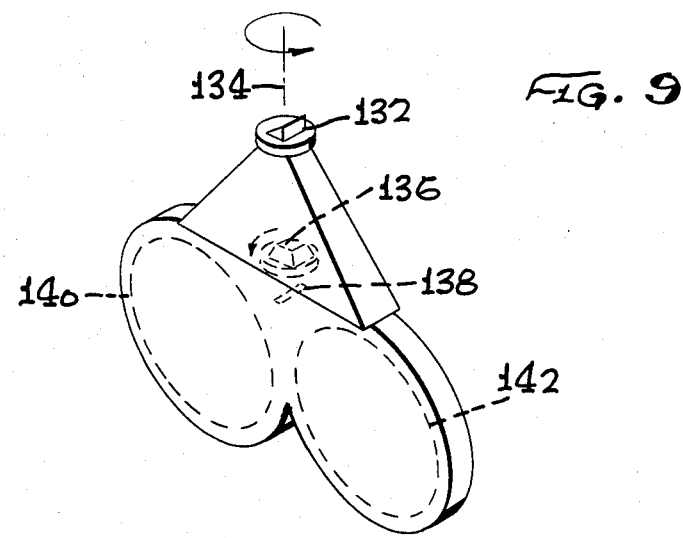
FIG. 9

APPARATUS FOR PROJECTING A LARGELY 360° MOTION PICTURE IMAGE

CROSS REFERENCE TO RELATED APPLICATIONS

This is a continuation-in-part of application Ser. No. 659,266 filed Oct. 9, 1984, now U.S. Pat. No. 4,560,260 which is a continuation of Ser. No. 412,040 now U.S. Pat. No. 4,477,160 filed Aug. 26, 1982, which is a continuation-in-part application Ser. No. 885,801 filed Mar. 13, 1979, now abandoned, which was a continuation-in-part of application Ser. No. 713,658 filed Aug. 12, 1976, now abandoned, which was a continuation-in-part of application Ser. No. 626,965 filed Oct. 29, 1975, now abandoned.

BACKGROUND OF THE INVENTION

A motion picture image that substantially completely encircles an audience, and that represents a substantially 360° view taken by a motion picture camera, provides an enhanced entertainment effect. To further enhance the entertainment, it is desirable that the motion picture image have high resolution and vividness. This can lead to some difficulties in that each "frame" of film which represents the image on the 360° screen, must have a considerable length, so that the process uses up large amounts of film.

U.S. Pat. No. 2,966,086 by D'Incerti et al describes a motion picture apparatus which is intended to display a 360° image on a screen. This patent describes the showing of the motion picture at 16 frames per second, which would result in an image of poor quality and substantial flicker. Various other patents have been granted for this type of system wherein the projected motion picture image subtends a wide angle on a curved screen of at least about 180°, but to the best of the applicant's knowledge, there have been no successful attempts to actually produce and show such systems.

SUMMARY OF THE INVENTION

In accordance with one embodiment of the present invention, a system is provided for projecting a vivid and realistic, approximately 360° image, on a screen that extends in a circle, for viewing by observers situated within (though possibly under) the perimeter of the screen. The apparatus includes a transport for moving a film rapidly past a projection location through which intense light passes. An optical system projects an image of a limited area of film that lies at the projection location, onto a limited area of the screen. The narrow image is rapidly scanned around the screen as the film moves, to create the appearance of a motion picture image that extends continuously in a circle about the viewer. The scanning equipment can be constructed to scan around the entire screen at at least 48 scans per second (the minimum rate at which the image will be perceived as flicker-free), and preferably at at least 50 scans per second, with each scan preferably representing the image on a new length of film of high resolution. The light source can have a sufficient intensity that the average intensity of light on a theoretically fully reflecting screen is greater than 16 foot lamberts, and preferably greater than 20 foot lamberts, for completely transparent regions of the film.

The novel features of the invention are set forth with particularity in the appended claims. The invention will be best understood from the following description when read in conjunction with the accompanying drawings.

BRIEF DESCRIPTION OF THE DRAWINGS

FIG. 5 is a sectional view of the light source of the apparatus of FIG. 3.

FIG. 6 is a plan view of a portion of the film strip of FIG. 3.

FIG. 7 is an edge view of the film of FIG. 6.

FIG. 8 is a diagram showing the geometry of a portion of the apparatus of FIG. 3.

FIG. 9 is a perspective view of a camera for taking a motion picture.

DESCRIPTION OF THE PREFERRED EMBODIMENTS

Figure 1:
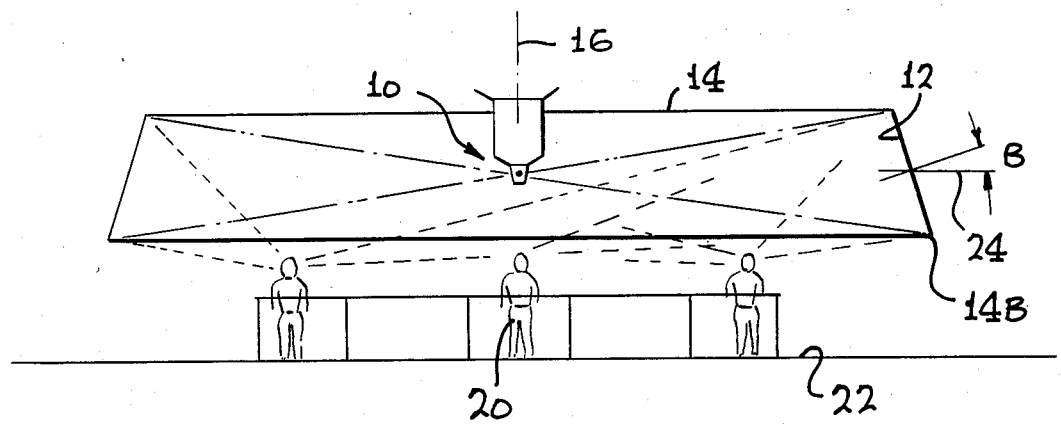
FIG. 1 is a partially sectional side elevation view of a motion picture apparatus constructed in accordance with the invention.
Figure 2:
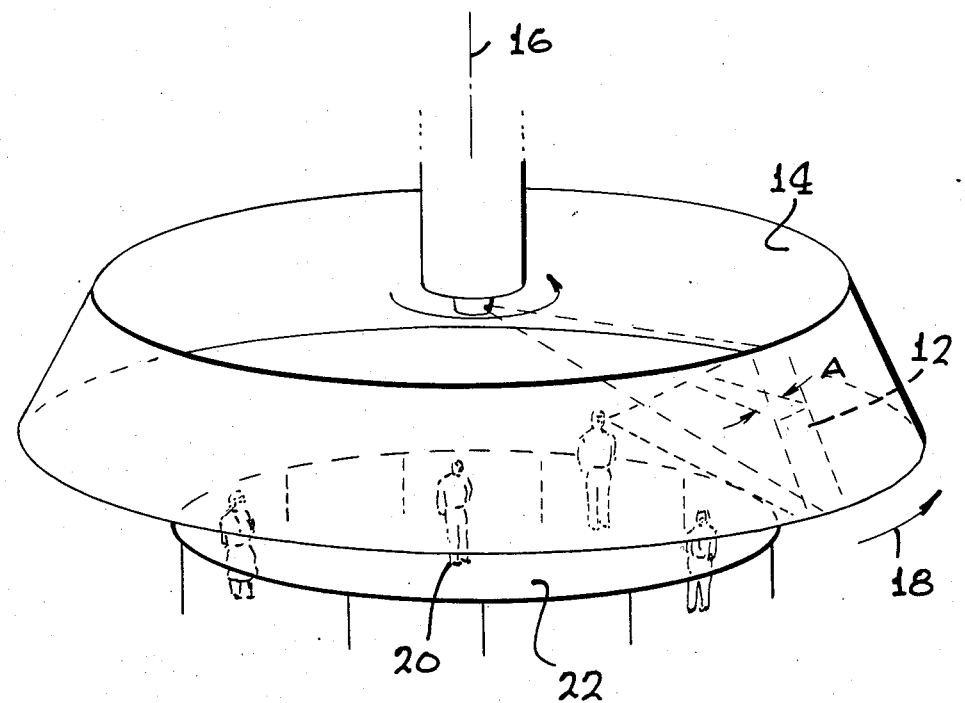
FIG. 2 is a perspective view of the projection apparatus of FIG. 1.

FIGS. 1 and 2 illustrate the present invention wherein a 360° scanning projector 10 is used to project a slit-shaped scanning image 12 of a narrow angle A onto a screen 14. The screen extends in largely a full circle about a substantially vertical axis 16. The scan image 12 is rapidly rotated in the direction of arrow 18 around the screen. The movement is rapid enough that the scanned image 12 rotates at least about 48 times per second around the screen. The repeated rapid scans result in the image on the screen appearing to be a continuous, non-flickering, image. Observers 20 can walk into the screening area 22 where the observers stand and which lies within and/or below the confines of the screen. The bottom 14B of the screen is at about the level of the heads of the average observers to be expected. This screen is oriented so that an imaginary line 24 that is normal to the screen surface is angled by an angle B such as 15° from the horizontal, to avoid cross-reflectance from opposite sides of the screen.

Figure 3:
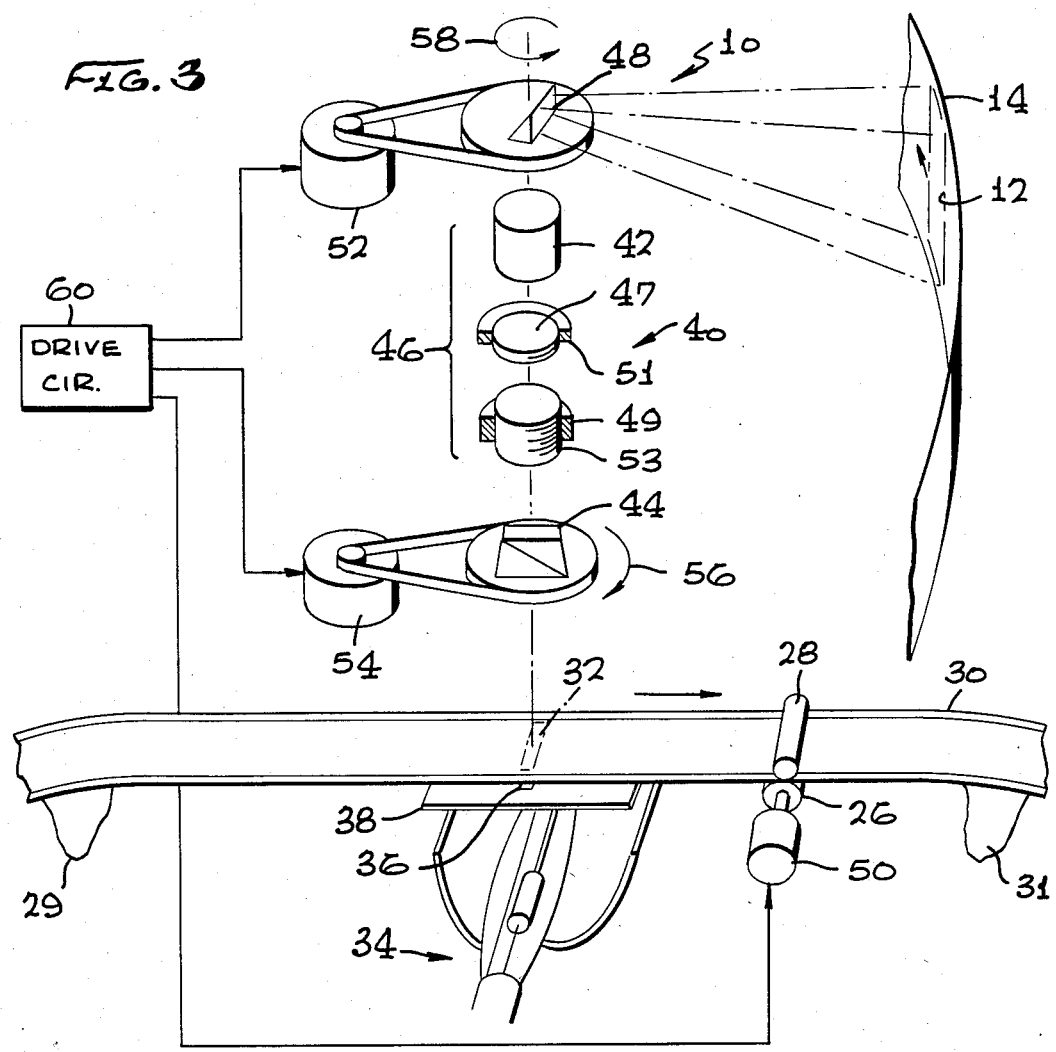
FIG. 3 is an upside-down view of a portion of the apparatus of FIG. 1, showing some details of the projection machinery thereof.

FIG. 3 is an upside-down view showing details of the projector 10 which projects a scan image 12 on the screen. The projector includes a motor-driven capstan 26 and an opposing roller 28 for moving strip-shaped film 30 between supply and takeup reels 29, 31, past a projection location 32. A high intensity light source 34 directs light through a slit-shaped opening 36 in an aperture plate 38 to illuminate the film at the location 32. Light passing through the film is directed through an optical system 40 which projects the image contained on the slit-shaped location of film, onto the screen at 12.

The optical system includes a dove prism or a pechan prism 44 located near the projection location 32. Light passing through the prism 44 is concentrated by a group of lenses 46 onto a deflecting element 48 which may be a prism or mirror, that deflects the light onto the screen.

In both photography and projection, the focal length of the lens assembly 46 must be exactly calculated to correct for the exact motion compensation so that the movement of the image at the film plane exactly matches the velocity of the film. Since lenses are not generally available to exact focal length specifications, provision has been made for the lens to be designed to the anticipated focal length and then be adjusted over a small range. Since the pechan prism 44 requires that the objective lens have a substantial back focal distance, a field lens 47 and a relay lens 4a have been included in the optical path in addition to the objective lens assembly 42. The field and relay lenses provide an extended back focal distance and the opportunity for adjustment of the resultant focal length by altering the relative positions of objective, field and relay lenses. Such adjustment can be done by turning the lenses with respect to threaded holders 51, 53.

A capstan motor 50 drives the film at a predetermined speed of many feet per second. A first closely-controlled motor 52 rotates the deflecting element 48 in synchronism with movement of the film so that as each "frame" of the film passes the projection location 32, the element 48 rotates by precisely one revolution. This is important to assure that the image of any object in the background which is not intended to move will not change position when the scan image 12 has rotated back to the same location on the screen. Another precision motor 54 turns the dove or pechan prism 44 in the direction of arrow 56 (which is opposite to the direction of rotation 58 of the deflecting element 48) at half the speed of rotation of the element 48. Rotation of the prism 44 is necessary to maintain the image upright on the screen.

Figure 4:
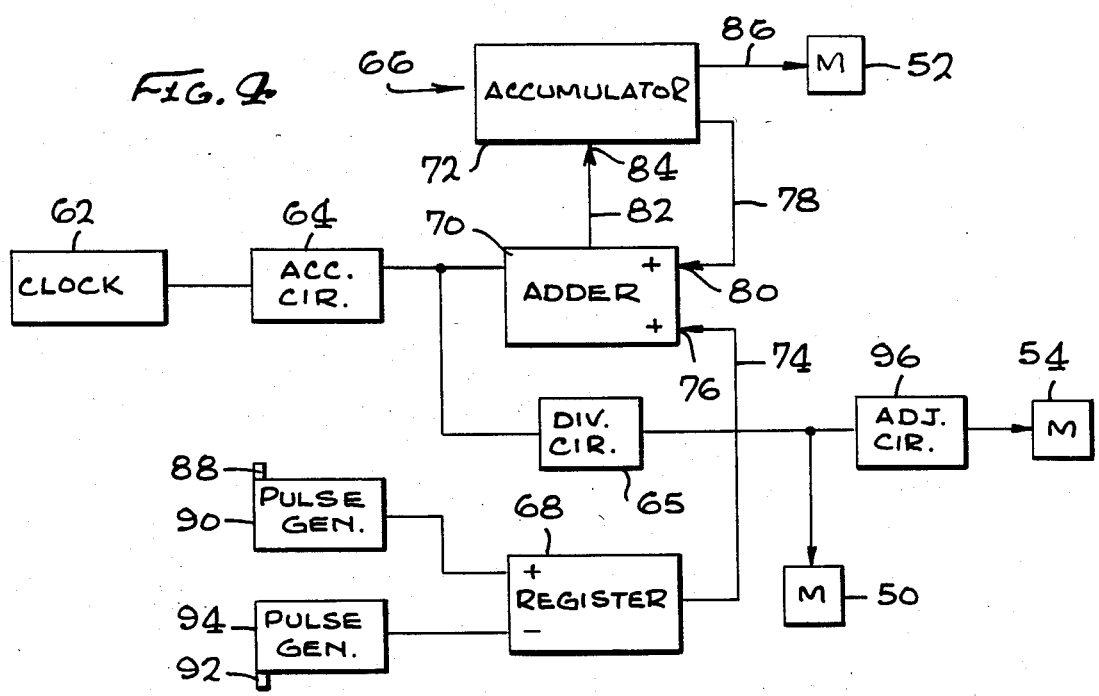
FIG. 4 is a block diagram showing details of the drive circuit of FIG. 3.

The three motors 50, 52 and 54 are driven in precise synchronism by a drive circuit 60. Once the motors are brought up to speed and the image is right side up and in the desired position around the screen, all of the motors can continue to be driven at a constant speed and in phase synchronism. When desired, the motion picture image on the screen 14 can be slowly rotated around the screen. This results in a portion of the background representing a view in a certain compass direction such as North, slowly moving around the screen, such as to where the background representing East had been, during a period on the order of five seconds. This can be accomplished by changing the phase or speed of one motor 52 relative to the others 50, 54. FIG. 4 is a simplified block diagram of the drive circuit 60, showing one way in which the image can be slowly rotated around the screen.

In FIG. 4, the speed of the three motors 50, 52, and 54 is set by the output of a clock 62. The three motors can be synchronous or stepping motors which advance every time a square or sine wave is delivered to them. The output of the clock is passed through an accelerator circuit whose output is initially zero and which increases slowly enough to allow the motors to keep up, until the output circuit 64 equals the clockrate. In this simplified circuit, it is assumed that the output of the clock 62 is divided by divider circuit 65 and delivered to motor 50. A digital differential analyzer 66 formed by a register 68, adder 70, and accumulator 72 enables the motor 52 which drives the deflecting element, to be driven slightly faster or slower to slowly rotate the image about the screen.

The register 68 holds a count which is constantly delivered over line 74 (which has several conductors) to a first input 76 of the adder. The accumulator 72 holds a variable count which it delivers over its store-count output 78 to another input 80 of the adder. At every clock pulse the adder 70 adds the inputs received at 76 and 80 and delivers the sum over a line 82 to an input 84 of the accumulator. The sum delivered to the accumulator 72 is immediately entered into the accumulator to replace the previous number therein. The accumulator 72 can hold only a limited count such as 128 is delivered through an overflow output 86 (and through an amplifier) to the motor 52. When a control 88 on a pulse generator 90 is activated, the count in the register 68 increases by 1, which results in the motor 52 being driven slightly faster. Additional increases in the count in the register 68 will further increase the speed of the motor 52. Such increase in the speed of the motor 52 results in the motion picture image on the screen very slowly moving about the screen. Operation of another control 92 on another pulse generator 94 decreases the count in the register 68, and causes the motor 52 to slow down, to stop the slow rotation of the image, and/or cause its slow rotation in the opposite direction. A somewhat similar adjustment circuit 96 can be provided for the motor 54 that rotates the dove or pechan prism to enable adjustment in the orientation of the image so it is always vertical on the screen.

FIG. 8 indicates some of the restraints required in the optical system, where the film moving past the projection location 32 is moving in a plane 100 and the optical system has a focal length F between an imaginary point 102 and the film plane. If the width at W of the opening through which light passes through the film is narrow, then it is easier to produce a sharp image on the screen for all portions of the film along the width W. The width W subtends an angle of 7°, so that the distance along an imaginary line G between the point 102 and the outer edge of the slit is only 0.19% greater than the length of a line H that extends between the point 102 and the center of the slit. If the angle of the scan image is increased from 7% to 16%, then a line J will extend between the point 102 and the outer edge of the slit. The line J is 0.98% greater than the length of the line H, or in other words is about 1% greater. Such a greater distance can result in slight blurring or slight vertical displacement of the image at the edge of the slit, and the film is preferably "viewed" at an angle of less than 16°. In an extreme case where the scan angle is 30°, then a line K which extends to the outer edge of the slit will have a length which is 3.5% greater than the length of the line H and there will be considerable blurring.

In a typical motion picture theatre, slight blurring at the opposite edges of the screen is not of great concern so long as the image at the middle of the screen is sharp. However, where the scan moves around the entire 360° of the screen, then slight blurring at the side edges of the slit will result in blurring across the middle of the entire screen. Slight blurring at the top and bottom of the screen is acceptable, but the middle of the screen should be very sharp. To assure such sharpness, applicant prefers to limit the width W of the slit so that the angle A (FIG. 2) of the scan is no more than about 16% so the distance J to the opposite sides is no greater than 1% more than the distance H. Actually, applicant prefers to use an angle C of about 7°, so that the distance to the opposite sides is no more than about 0.2% of the distance to the center in FIG. 8. The angle A of the scan image is also preferably less than 16°.

The use of a narrow slit results in the need to create a very high light intensity at the slit in order to obtain a high average luminance of the screen. FIG. 5 illustrates a light source 106 which can produce a very high light intensity over the entire width of the slit 36. The source includes a long arc xenon lamp 108 having a pair of parallel but spaced electrodes 110, 112, with a large voltage difference between them to establish an arc 114. The electrodes extend parallel to each other along a length which is greater than their spacing. Since the arc is of a band shape, the light can more easily be reflected into the band-shaped opening 36 and substantially uniformly illuminate film lying at the opening. The light source also includes a reflector 116 that reflects much of the light from the lamp onto the opening.

FIG. 6 illustrates one "frame length," of a length L, of the film which represents the image that is projected around 360° of the screen for a short period of time. There are actually no distinct frames or vertical lines on the film that divide it into frames. However, from any point on the film to another point spaced a framelength distance L therefrom, most of the frame, or at least the background thereof, will substantially repeat. For the particular strip of film shown in FIG. 6, different compass directions of the view on the film are noted by the marks N, E, S and W. In one system that has been designed, each "frame" of film (which extends from one direction such as North to a next North) the photographic image had a width Z of 20 mm (millimeters) and a length L of 200 mm. The system was designed so that the film traveled at a rate of 60 frame lengths per second past the projection location, so that the film had to travel at a speed of about 472 inches per second or 39 feet per second. A large commercial film platter can have a diameter such as five feet, and still be readily easily handled by one person. Accordingly, it was thought desirable to limit the diameter of each roll of film to about 5 feet, or about 48,000 feet of film.

Typical prior art film stock has a thickness T (FIG. 7) of about 5.5 mil (1 mil equals one 1000th inch). If such prior art film stock wer used with a frame length of 200 millimeters and a "frame rate" of 60 per second, then a five foot diameter roll could hold only 20 minutes of film. This is unsatisfactory partially because of the large number of rolls required to show a motion picture of reasonable length. To increase the projection time for a 5 foot diameter roll, the thickness T of the film is greatly reduced to less than half the 5.5 mil thickness and preferably less than 2 mil, so to a thickness of about 1.8 mil to provide about 60 minutes of showing time per roll.

In the prior art, a substantial film thickness such as 5½ mil was required to enable the film to withstand the rapid start and stop motions which occur whenever the film had to be held stationary in front of the projection location. Also, the film had to have a substantial thickness to avoid damage by contact of sprocket teeth with the sprocket holes in the film. Applicant avoids sprocket holes, and transports the film by the use of a capstan drive, using at least one motor driven capstan such as shown at 26 in FIG. 3. The continuous motion of the film and the fact that no sprocket holes have to be formed therein which must be engaged by sprocket teeth, greatly reduces the possibility of damage to the film, so that very thin stock can be used. This enables the achievement of a longer running time described above for a 5 foot roll of film. Even for the minimum frame rate of 48 frames per second to avoid flicker, and a frame length of 200 mm, a film thickness of 2 mil allows a 55 minute showing time. An anamorphic lens can be used to halve frame length, thus reducing film length needed to half the above, though with some loss of image sharpness.

In the sprocketless film 30 shown in FIG. 6, two tracks 120 and 122 are provided along each edge, outside the center band 124 which contains the image to be projected. One track 120 has position markings that enable the determination of the precise location of the film to enable close monitoring of film movement. The other track 122 is the sound track. The sound track comprises a digital recording of sound, which is made possible by the very rapid movement of the film. This may be compared to prior art commercial motion picture systems such as those using 35 millimeter film advanced at 24 new frames per second which resulted in a film velocity about 1/10th that of the above-described system. For the simplest digital recording, sufficient separate bits must be defined along the sound track 122 to provide 40,000 16 bit word markings per second, to generate 40,000 16 bit words per second for producing sound up to a frequency of 20 KHz. The film in the above-mentioned system moves rapidly enough to enable the sound to be encoded by self-correcting digital encoding. As a result, very high quality sound can be produced despite scratches that might occur along the sound track 122. The acceptability of such small scratches permits the film to be driven by capstans that have recesses along the image band 124, and that engage the film only near its opposite edges at the tracks 120, 122.

FIG. 9 illustrates a 360° camera whose rotation mechanism can be constructed so it is similar to the mechanism shown in FIG. 3. That is, a deflecting element 132 in the form of a prism or mirror is located where it can have an unobstructed 360° view, and is rapidly rotated about a vertical axis 134. Light deflected by the element 132 passes through a rotating dove or pechan prism 136 and is focused onto an imaging location 138 past which film rapidly moves. In the arrangement of FIG. 9, the film is below the optical mechanism so the portion at the imaging location 138 can be wound onto and off of reels 140, 142 that are out of the way of the deflecting element 132. The film can be developed and then shown in the projector of FIG. 3.

Where a single frame length of film is projected only once on the screen before the beginning of the next frame length, at least about 48 new frame lengths of film must be projected on the screen to avoid flicker. In commercial motion picture theaters, 24 frames per second are projected on the screen, but each film frame is flickered twice, to avoid observable flickering in the projected motion picture image. Applicant has found that when at least 50 new frames of film are shown on a circular screen, and with the good resolution and high light level of commercial motion picture systems, (at least 12 foot-lambers), that an unusually high vividness and realism are realized by the observer of the motion picture film. Such unusual vividness and realism are achieved in the present 360° projection system by taking and showing film at a rate of at least 50 new frame lengths per second. Also, further enhancement of the image is achieved with a light source that provides sufficient intensity that the average light projected on the screen, when there is completely transparent film or no film, is an average of at least 16 foot lamberts and preferably over 20 foot lamberts. For a scan image occupying only 7° of the 360° total scan, this requires that the 7° scan image produce an illumination level of at least about 820 lamberts in order to obtain an average at the screen of at least 16 foot lamberts. Also, the area of each one-third of a "frame length" (which covers a 120° field of view) and the resolution are sufficient to at least equal good professional motion picture photography in the 35 mm format wherein there are at least 3.4 million pixels per frame length of the film; therefore there are at least 10 million pixels per frame length. As projected on the screen there should be at least about 450 line pairs across the height of the projected image.

By thus projecting at least 50 new frame lengths per second, with an average illumination level of 16 foot lamberts and a resolution which is at least as great as that of good 35 mm commercial motion picture film, a 360° motion picture image of unusual vividness and realism is produced. A resolution at least as good as that of a good commercial theater motion picture (at least 10 million pixels per one-third frame) and a light intensity at least as high as in a good commercial theater of at least 12 foot lamberts can result in a good commercial quality image. When this is combined with a "frame" rate of at least 50 new frames per second, an unusually high degree of realism can be produced. Even greater light intensity further enhances the image.

Figure 10:
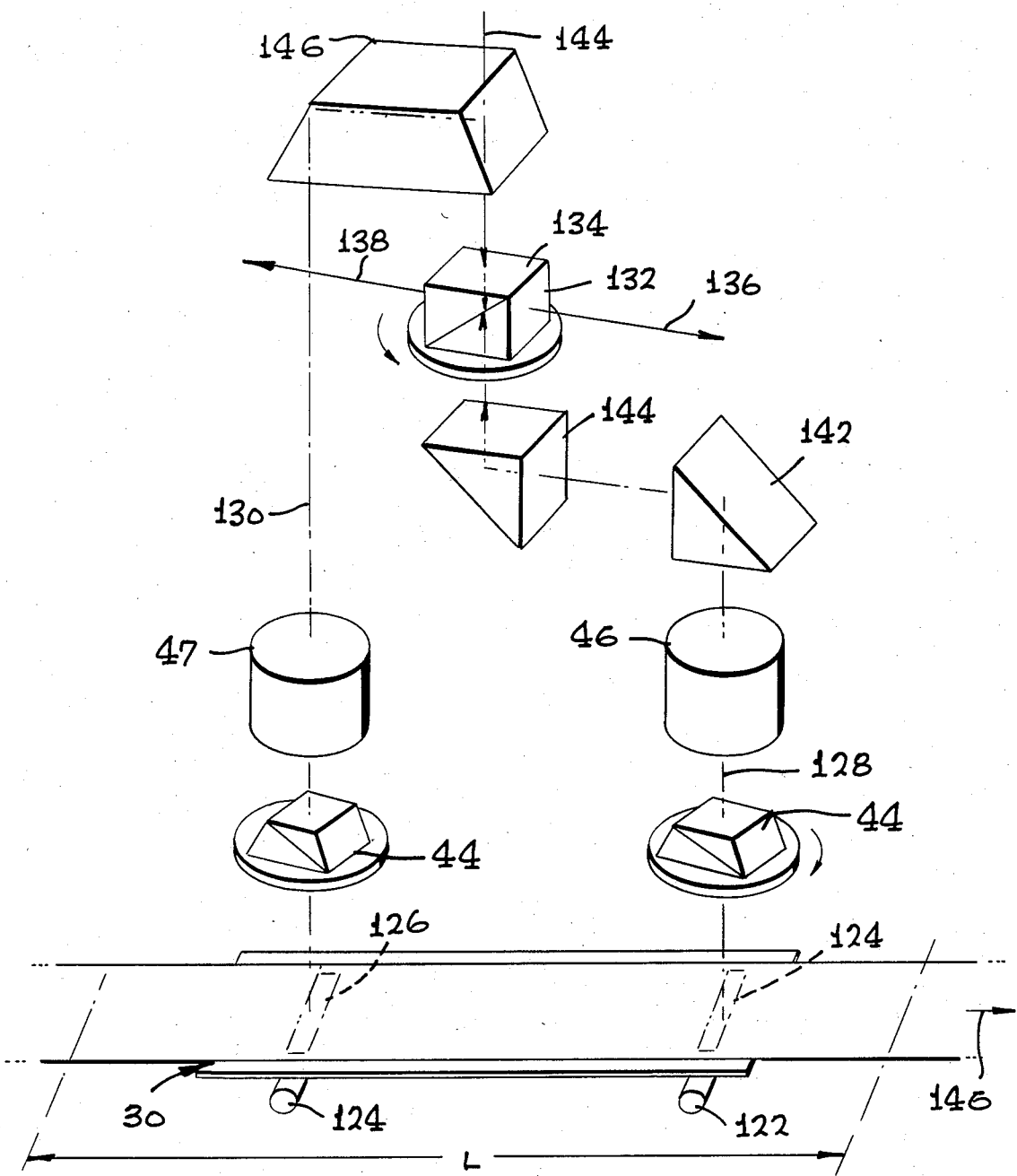
FIG. 10, is an upside-down view of a portion of a projection system of another embodiment of the invention.

FIG. 10 illustrates another system 120 which enables film projection onto a 360° screen at a lower frame rate, such as 24 frames per second with each frame shown twice. This is largely similar to the present commercial theater motion picture practice wherein 24 new frames are shown each second, with each frame interrupted once to produce 48 showings or flickers per second. The system 120 includes two light sources 122, 124 which direct light through two projection locations 124, 126 of the film that are spaced apart, along the length of the film, by one-half the "frame length" L of the film. Light passes through each projection location 124, 126 and along a corresponding optical path 128, 130 to a pair of rotating prisms 132, 134. From the final prisms 132, 134, light beams 136, 138 are directed in 180° opposite directions at a 360° screen of the type shown in FIG. 2.

Several optical elements are positioned along each optical path, including rotating prisms 44 and lens groups 46 and 47. A pair of prisms 140, 142 direct light along the axis of rotation 144 of the final prisms. Another pair of prism portions at an element 146 direct light in the opposite direction along the rotation axis 144. The film 30 is moved at a constant speed of 24 L per second in the direction of arrow 146 where 24 new frame lengths per second are to be projected at 30 L per second where thirty new frame lengths per second are to be projected.

Thus, the invention provides apparatus for generating a largely 360° motion picture image on a screen, which is substantially free of flicker and which can have an unusually high vividness and realism. An unusually high vividness and realism is obtained by repeatedly scanning the images of the motion picture film around substantially the entire screen, at least 50 scans per second, with each scan representing the image on a new length of film. At the same time, sufficient light is projected to produce a high average illumination level preferably greater than 16 foot lamberts on the screen for completely transparent regions of the film, using at lest 35 millimeter commercial theater resolution per third of each frame length. The film can be devoid of sprockets, can have a thickness less than half that of present film, and can be driven by capstan drives of the type used fro tape transports. A circuit for driving the motors, can be constructed to enable selected slight change of speed and/or phase of one of the motors relative to another to enable the image on the screen to slowly rotate around the screen.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for generating a largely 360° motion picture image that corresponds to a motion picture image on a strip of film, comprising:

a screen extending in largely a full circle about a predetermined substantially vertical axis;

a transport for moving an elongated film past a film projection location;

a light source located to direct concentrated light through said projection location;

an optical system for projecting an image of a limited area of said film lying at said projection location onto a limited area of said screen; and means coupled to said optical system for repeatedly scanning said image around said screen as said film moves, to create the appearance of a motion picture image that largely encircles said vertical axis;

said optical system includes optical elements located to receive light passing through a largely slit-shaped area of film lying at said projection location and form a largely slit-like image on said screen, including a light deflector located on said vertical axis to deflect light from a direction along said axis to said screen, said light deflector rotatable about said axis;

said transport includes a film drive motor means for moving said film past said projection location;

said means for scanning includes a deflector rotating motor means for rotating said deflector about said axis; and including a circuit for controlling said film drive motor means and said deflector rotating motor means so they normally move in synchronism, so that spaced portions of said film each representing a view looking in a predetermined compass direction, are normally imaged on the same location on the screen during a plurality of sequential complete scans of said screens;

said circuit also including means selectively operable to move one of said motor means at a different speed than is required for synchronism with the other motor means, whereby to slowly turn the background in the screen image around the screen.

2. An apparatus for projecting the images on a strip of motion picture film onto a screen that extends largely 360° about a vertical axis, by projecting an intense beam of light through an aperture and a slit-shaped region of the film that lies over the aperture and directing the projection onto the screen, and rapidly scanning the projection around the screen as the film is rapidly moved past the aperture, the improvement of a light source for projecting the intense beam of light, comprising:

a light-emitting tube containing a pair of spaced parallel electrodes that extend parallel along a length which is a plurality of times as great as the distance by which they are spaced, and means for establishing an arc between said electrodes to generate an intense slit-shaped, light-emitting region onto said aperture to cover primarily said slit-shaped area of said film.

3. Apparatus for generating a largely 360° motion picture image on a screen of a motion picture image on a strip of film, comprising:
   a transport for moving an elongated film along a film path;
   a plurality of projection locations spaced along said path;
   means for directing light through said film at each of said projection locations;
   means for projecting light passing through film at each of said projection locations onto a different location on said screen to form a limited image area on the screen, said projecting means including means for rotating said limited image areas in synchronism around said screen.

4. The apparatus described in claim 3 wherein:
   said strip of film includes images that largely repeat at intervals of length L along the length of the film;
   said plurality of projection locations comprise two projection locations spaced a distance of one-half L along the length of the film path;
   said projecting means projects the portions of the images of the film at said two projection locations onto diametrically opposite locations on the screen.

* * * * *